(12) United States Patent
Prigent et al.

(10) Patent No.: US 8,132,241 B2
(45) Date of Patent: Mar. 6, 2012

(54) METHOD FOR DEVICE INSERTION INTO A COMMUNITY OF NETWORK DEVICES

(75) Inventors: Nicolas Prigent, Burbank, CA (US); Olivier Heen, Domloup (FR); Jean-Pierre Andreaux, Amsterdam (NL); Olivier Courtay, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 383 days.

(21) Appl. No.: 12/223,427

(22) PCT Filed: Feb. 5, 2007
(Under 37 CFR 1.47)

(86) PCT No.: PCT/EP2007/051079
§ 371 (c)(1),
(2), (4) Date: May 19, 2009

(87) PCT Pub. No.: WO2007/090815
PCT Pub. Date: Aug. 16, 2007

(65) Prior Publication Data
US 2011/0035791 A1 Feb. 10, 2011

(30) Foreign Application Priority Data

Feb. 7, 2006 (EP) .................................... 06300115

(51) Int. Cl.
*H04L 29/06* (2006.01)

(52) U.S. Cl. .......................................................... 726/6
(58) Field of Classification Search .................... None
See application file for complete search history.

(56) References Cited

U.S. PATENT DOCUMENTS

| 6,092,201 A | 7/2000 | Turnbull et al. |
| 2004/0088542 A1* | 5/2004 | Daude et al. .................. 713/156 |
| 2005/0177715 A1 | 8/2005 | Somin et al. |

FOREIGN PATENT DOCUMENTS

WO WO 2005/057876 6/2005

OTHER PUBLICATIONS

Search Report Dated Apr. 24, 2007.

* cited by examiner

*Primary Examiner* — Brandon Hoffman
(74) *Attorney, Agent, or Firm* — Robert D. Shedd; Harvey D. Fried; James McKenzie

(57) ABSTRACT

A method for performing at least one evolution operation in a dynamic, evolutive community of devices in a network comprising at least a first device. The method comprises a step of sending at least one message over the network from the first device to a second device, wherein the first device continues the method without acknowledgement of the at least one message from the second device. The method is suitable for execution on clockless devices. A device for performing the method is also claimed.

4 Claims, 2 Drawing Sheets

METHOD FOR DEVICE INSERTION INTO A COMMUNITY OF NETWORK DEVICES

This application claims the benefit, under 35 U.S.C. §365 of International Application PCT/EP2007/051079, filed Feb. 5, 2007, which was published in accordance with PCT Article 21(2) on Aug. 16, 2007 in English and which claims the benefit of European patent application No. 060300115.0, filed on Feb. 7, 2006.

TECHNICAL FIELD OF THE INVENTION

The invention applies to digital networks, especially dynamic, evolutive, heterogeneous networks comprising wireless parts.

BACKGROUND OF THE INVENTION

Definitions

The definitions of the following expressions are for comprehension purposes and are non-limitative:

Dynamic network: devices in the network can be present or absent.

Evolutive network: new devices may join the network, older devices may leave the network or be rejected by it (for example when stolen).

Heterogeneous network: not all devices are able to communicate with all other devices therein, for example if one part of the network complies with standard IEEE 802.11g, another part of the network complies with standard IEEE 802.3, in which case a bridging device is needed for the communication between the parts.

Two-way connections: two devices are two-way connected when both are able to initiate communication with the other.

Community: a community is a set of devices associated with an entity, such as a single user or a group of users (e.g. a family or company services).

Community knowledge: a device associated with (also called belonging to) a community is aware of it; the device knows that it is associated with the community and it knows at least some of the other devices in the community.

Prior Art

WO 2005/057876 teaches a system that provides secure, user-friendly evolution operations and banishment of non-trusted devices in a community. Each network device stores a local representation of the community to which it belongs. The representation comprises a provable identity for itself, three lists of devices that—1) are trusted by the device, 2) are trusted by and trusts the device, and 3) are distrusted by the device. Each device is able to execute a protocol to establish trusted connections with the other devices in the network.

While this is a good solution, it needs internal clocks in the devices to work. Since it is believed that in the future more and more devices will lack internal clocks—e.g. so called smart dust—it is desirable to have the possibility to perform secure, user-friendly evolution operations for such devices. A further advantage is that it has proven possible to improve it by minimising the processing power needed to execute the protocol. The present invention presents such an improvement.

SUMMARY OF THE INVENTION

In a first aspect, the present invention is directed to a method for performing at least one evolution operation in a dynamic, evolutive community of devices in a network comprising at least a first device. The method is suitable for execution on a clockless device. The first device sends at least one message over the network to a second device, and continues the method without acknowledgement of the at least one message from the second device.

In a preferred embodiment, the dynamic, evolutive network at least partly is a wireless network.

In a further preferred embodiment, the dynamic, evolutive network is at least partly a power line carrier network.

In another preferred embodiment, the dynamic, evolutive network is heterogeneous.

In yet another preferred embodiment, the at least one evolution operation is insertion of the second device into the dynamic, evolutive community. It is preferred that the first device receives from a user an instruction to insert the second device, sends a certificate for the first device to the second device, sets a level of trust for the second device to trusted, requests a certificate for the second device from the second device, receives a certificate for the second device from the second device, and stores the certificate for the second device. Preferably, at least one of the certificate for the first device and the certificate for the second device is not certified by a Certificate Authority.

In a second aspect, the invention is directed to a device adapted to perform at least one evolution operation in a dynamic, evolutive community of devices in a network. The device comprises a processor adapted to send at least one message via an interface over the network to a second device, and to continue the method without acknowledgement of the at least one message from the second device.

BRIEF DESCRIPTION OF THE DRAWINGS

The various features and advantages of the present invention and its preferred embodiments will now be described with reference to the accompanying drawings which are intended to illustrate and not to limit the scope of the present invention and in which.

DETAILED DESCRIPTION OF A PREFERRED EMBODIMENT OF THE INVENTION

Figure 1:
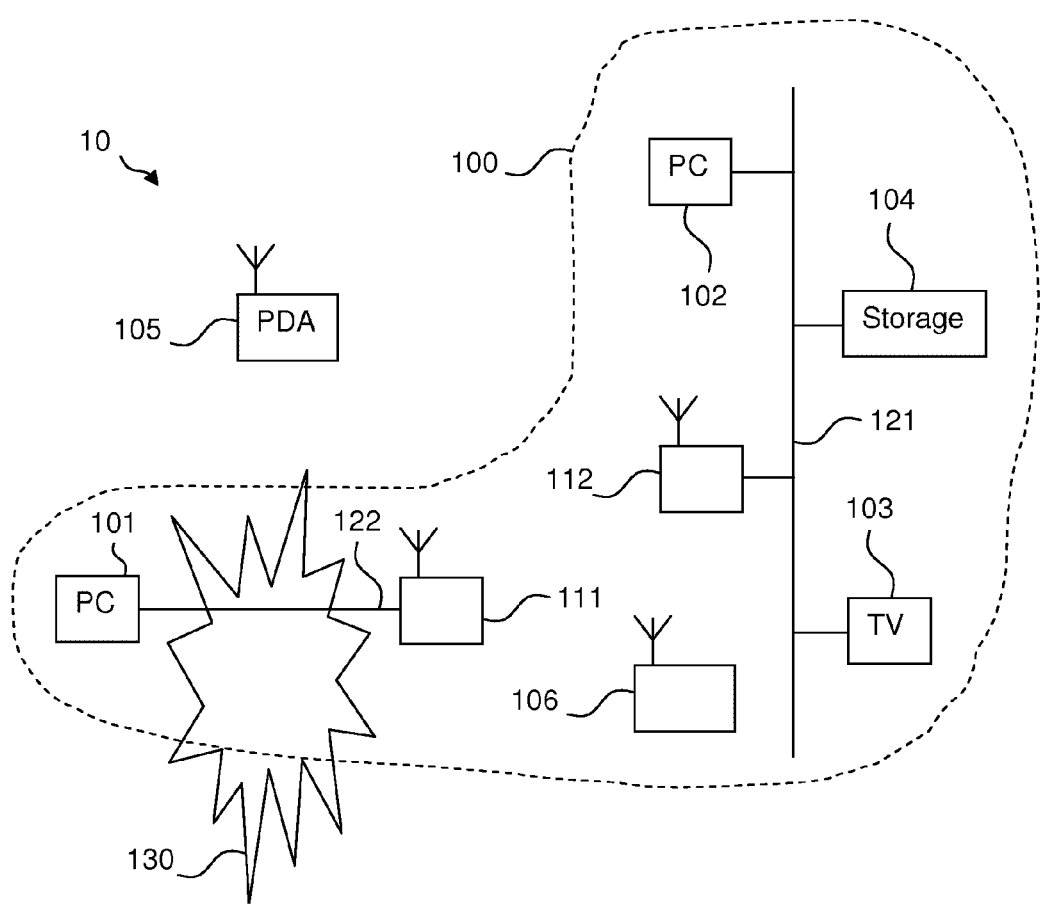
FIG. 1 illustrates an exemplary community in which the invention is used.

FIG. 1 illustrates an exemplary community 100 in a network 10 for use with the invention. Non-limitative examples of devices are Personal Computers (PC) 101, 102, a TV set 103, a storage unit 104, a PDA (Personal Digital Assistant) 105, and a so-called smart dust device in the form of a thermometer 106. As can be seen, the PDA 105 does not belong to the community 100, although it may be part of the network 10. The second PC 102, the storage unit 104 and the TV set 103 are connected via a first bus 121, to which also a first radio communication unit 112 is connected. The first radio communication unit 112 assures communication with a second radio communication unit 111 and thereby, via a second bus 122 to the first PC 101. The radio communication units 111, 112 may also communicate with the PDA 105. The thermometer 106 does not have an internal clock and preferably communicates with one of the radio communication units 111, 112 via radio communication. A device preferably comprises a two-way network interface (such as WiFi, Ethernet, IEEE1394 . . . ), a cryptographic module, and a memory (RAM, FLASH . . . ).

A device A that implements the protocol according to the invention stores the following information:

A first public/private key pair ($P_A$, $S_A$) unique to the device. The pair is used for signature generation and verification using respectively the public key algorithms SignGenAlgo and SignVerAlgo.

A second public/private key pair ($RP_A$, $RS_A$) unique to the device. The pair is used for revocation information generation and verification using respectively the public key algorithms SignGenAlgo and SignVerAlgo.

A public and unique identifier $PI_A$, called provable identity. PI is the digest of the concatenation of the device's public key P and revocation public key RP using the algorithm HashAlgo.

A random number generator algorithm RandAlgo.

The device also stores a Community Knowledge Table (CKT) with at least some of the following information about other devices in the community:

Device identity: the provable identity PI.

Status: the level of trust that the device has for another device: KNOWN, i.e. the device knows the other device's identity, TRUSTED, i.e. the device knows and trusts the other device, and REVOKED, i.e. the device deems that the device no longer belongs to the community.

Public keys: P and/or RP.

Certificate or chain of certificates or revocation information.

A device A uses its private key $S_A$ to generate a certificate $Cert_A(A)$ for itself. A certificate advantageously comprises two structures, an information structure and a signature structure. The information structure provides the information, and the signature structure ensures authenticity of the information. Certificate $Cert_A(A)$ preferably comprises:

in the information structure:
  A's provable identity, $PI_A$;
  A's public revocation key, $RP_A$; and
  A's public key, $P_A$; and
in the signature structure, the signature of the information structure using A's private key $S_A$.

It is also possible for a device A to generate a certificate $Cert_A(B)$ for a subject device B. If A has access to B's certificate, $Cert_B(B)$, it can retrieve the public key, $P_B$, the public revocation key, $RP_B$, and the identity, $PI_B$, of B, and use this information to construct and sign the certificate $Cert_A(B)$, which comprises:

in the information structure:
  the provable identity of the signer, $PI_A$;
  the provable identity of the subject: $PI_B$;
  the public key of the subject: $P_B$;
  the public revocation key of the subject: $RP_B$; and
in the signature structure, the signature of the information structure by the secret key of the signer, $S_A$.

In this manner chains of certificates may appear, i.e. device A certifies device B that in turn certifies device C and so on. In this case the starting certificate is denoted $Cert_Z(X)$, leading through $Cert_C(Z)$ and $Cert_B(C)$ to $Cert_A(B)$. For convenience, such a chain is in this exemplary case denoted $Cert_A^*(X)$, where the index indicates the latest issuer, the asterisk that it is a chain of certificates, and the letter in parenthesis the first certified device.

It is preferred that a device resolves, i.e. verifies, a chain of certificates only when a loop is formed in the chain or during automatic device insertion (further described hereinafter).

To verify a certificate (or revocation information), a device uses the public key (or revocation public key) of the issuing device, e.g. a device D would use $P_A$ to verify $Cert_A(B)$. To verify a chain of certificates, a device verifies all the certificates in the chain.

Evolution Operations

It is assumed that the Community Administrator performs the evolution operations. The Community Administrator comprises all the administrators, i.e. authorised users, of devices in the community. A person skilled in the art will appreciate that the term where applicable may mean the administrator of the device, and also that the administrator may delegate decisions to the device. It is also assumed that every administrator in the community trusts every other administrator therein. It is advantageous that trust may be "borrowed" between devices, i.e. in a community of A and B where A's administrator trusts C, B's administrator accepts that B too trusts C. It is further assumed that public keys and revocation public keys are stored in certificates issued by trusted devices.

Device Initialisation is performed to prepare a device for insertion into the community.
  a. The device generates a public/private key pair (P, S) using RandAlgo.
  b. The device generates a revocation public/private key pair (RP, RS) using RandAlgo.
  c. The device empties its Community Knowledge Table.
  d. The device displays a user message "Initialisation successful".

Device Re-initialisation is for example performed to prepare a device for reinsertion into the community under another identity, such as when the device is sold or otherwise changes users.
  a. The device erases its public/private key pairs (P, S) and (RP, RS).
  b. The device empties its CKT.
  c. The device generates a new public/private key pair (P, S) using RandAlgo.
  d. The device generates a new revocation public/private key pair (RP, RS) using RandAlgo.
  e. The device displays a user message "Re-initialisation successful".

Device Insertion is performed to make the device part of a community. The Community Administrator asks device A to insert device B in A's community. Depending on the status that A has assigned to B, there are four possibilities.

1. A has not assigned a status to B.
  a. A sends a Request for Certificate message to B.
  b. If B TRUSTS A, then it generates a certificate $Cert_B(A)$ that it sends to A in a Certificate message. B does not respond if it does not trust A.
  c. If A receives $Cert_B(A)$, it stores this in the CKT.
  d. A displays user message "Insertion Successful".
2. A TRUSTS B
  a. A displays user message "Insertion not possible. Device already trusted."
3. A KNOWS B
  a. A generates a certificate $Cert_A(B)$ and sends this to B in a Certificate message.
  b. A changes the status of B in its CKT to TRUSTED.
  c. If B TRUSTS A, then it stores $Cert_A(B)$ in its CKT. B discards the certificate if it does not trust A.
  d. A sends a Request for Certificate message to B.
  e. If B TRUSTS A, then it generates a certificate $Cert_B(A)$ that it sends to A in a Certificate message. B does not respond if it does not trust A.
  f. If A receives $Cert_B(A)$, it stores this in the CKT.
  g. A displays user message "Insertion Successful".

4. A has assigned the status REVOKED to B
   a. A displays user message "Insertion not possible. Device revoked."

Device Banishment is performed to banish from a community a device that is not reachable.
   a. Device A displays all provable identities PI of the devices it TRUSTS and KNOWS and that are not reachable.
   b. The Community Administrator selects a device B from the list.
   c. A assigns status REVOKED to B.
   d. A computes and stores revocation certificate $Revoc_A(B)$.
   e. A displays user message "Banishment successful".

Device Removal is used to remove a device (device A) from a community.
   a. Device A chooses a device B that is TRUSTED and that is reachable. If no such device is found, it displays user message "Retry device removal later".
   b. A computes $Revoc_A(A)$, sends it to B in a Revocation Information message, and sets a timer.
   c. B receives the Revocation Information message and assigns the status REVOKED to A.
   d. B generates and stores $Revoc_B(A)$.
   e. B returns a Revocation Acknowledgement message comprising $Revoc_B(A)$.
   f. If A receives no Revocation Acknowledgement message before the timer times out, it displays user message "Retry device removal later".
   g. If, however, A does receive a Revocation Acknowledgement message, it
      i. Erases its public/private key pairs (P, S) and (RP, RS).
      ii. Empties its CKT.
      iii. Generates a new public/private key pair (P, S) using RandAlgo.
      iv. Generates a new revocation public/private key pair (RP, RS) using RandAlgo.
      v. Warns the Community Administrator that A has been successfully removed from the community.
      vi. Displays a user message "Removal successful".

It should be noted that every evolution operation may be performed without the need of a clock if the possibility of a "Retry device removal later" message during Device Removal is removed. In this case, it is up to the Community Administrator to verify that device A really has been removed. On the other hand, while it is possible that device A will be a device without internal clock, it is likely that device B will possess one, in which case the internal timer may be used.

An advantageous effect of the possibility to perform the protocol without clocks is that the certificates that are used need not be signed by a Certificate Authority. This further means that the protocol may be used in communities that are unable to verify the certificate with the Certificate Authority, for example if the community has no Internet connection.

Other Operations

Community knowledge diffusion is used to spread community knowledge in the community. Each device in the community periodically sends the certificate/revocation information in its CKT to reachable TRUSTED devices.
1. Device A sends a Community Knowledge message comprising its CKT.
2. Upon reception of the message, a device B:
   a. For each device X with status REVOKED:
      i. If B has never assigned any status to X, it stores $P_X$ and $RP_X$ in its CKT, and assigns the status REVOKED to X.
      ii. If B KNOWS or TRUSTS X, it assigns the status REVOKED to X.
      iii. B generates and stores $Revoc_B(X)$ in its CKT.
   b. For each device X TRUSTED or KNOWN by A:
      i. If B has never assigned any status to X, it stores $P_X$ and $RP_X$ in its CKT, assigns the status KNOWN to X, and stores the chain of certificates $Cert_X*(B)$, which is a combination of $Cert_X(A)$ or $Cert_X*(A)$ and $Cert_A(B)$.
      ii. If B KNOWS or TRUSTS X, it replaces $Cert_X*(B)$ in its CKT with the combination of received $Cert_X*(A)$ and $Cert_A(B)$, if the combination is shorter than $Cert_X*(B)$.
      iii. Nothing is done if B has assigned the status REVOKED to X.

Automatic device insertion is used to insert a device into the community without intervention of the user or the Community Administrator. If device A learns (through Community Knowledge Diffusion) that a device B, which is TRUSTED or KNOWN by A, and for whom A stores a chain of certificate $Cert_B*(A)$ is reachable, then the following steps are performed:
1. A sends a Chain of Certificates message comprising $Cert_B*(A)$.
2. If B has never assigned any status to A:
   a. B adds $P_A$ and $RP_A$ to its CKT and assigns status TRUSTED to A.
   b. B generates certificate $Cert_B(A)$.
   c. B sends a Certificate message comprising $Cert_B(A)$ to A.
   d. A replaces $Cert_B*(A)$ with $Cert_B(A)$ in its CKT.
3. If B TRUSTS A:
   a. B generates certificate $Cert_B(A)$.
   b. B sends a Certificate message comprising $Cert_B(A)$ to A.
   c. A replaces $Cert_B*(A)$ with $Cert_B(A)$ in its CKT.
4. If B KNOWS A:
   a. B assigns status TRUSTED to A.
   b. B generates certificate $Cert_B(A)$.
   c. B sends a Certificate message comprising $Cert_B(A)$ to A.
   d. A replaces $Cert_B*(A)$ with $Cert_B(A)$ in its CKT.
5. If B has assigned status REVOKED to A:
   a. B discards the Chain of Certificates message.

Blacklisting is used if a user knows that there are devices that he never wants to insert, e.g. a neighbour's network devices. It may be annoying to the user if his device repeatedly asks him for insertion of these devices, and it may also be annoying for the user if his device includes these devices in the list of candidate devices as the latter makes it more difficult to find the device that the user does want to insert.

To enable blacklisting, each device stores in its CKT a blacklist BL of devices. The blacklist is communicated to other devices during Community Knowledge Diffusion.

A device will not deal with devices in the blacklist, which means that the device for example will not ask the user to insert devices therein.

Using a separate list, instead of standard revocation, gives the possibility to "unblacklist" devices easily, i.e. to allow a previously blacklisted device to be a candidate for insertion at the blacklisting device, and so on.

Lists of trusted devices may be needed for some applications. If so, a device A stores a list of mutually trusted devices MT in its CKT. If A receives revocation information regarding B from a trusted device, A removes B from the trusted list MT. If A TRUSTS B and receives a Community Knowledge message from B, then A adds B to its MT list.

It should be noted that in the description of the algorithms hereinbefore, device A is the device that the user uses at the moment. As certain operations may require the user to interact with more than one device, the device that first was device B may later become device A. This is possible as the algorithms, where applicable, are the same regardless of which the current device is.

Figure 2:
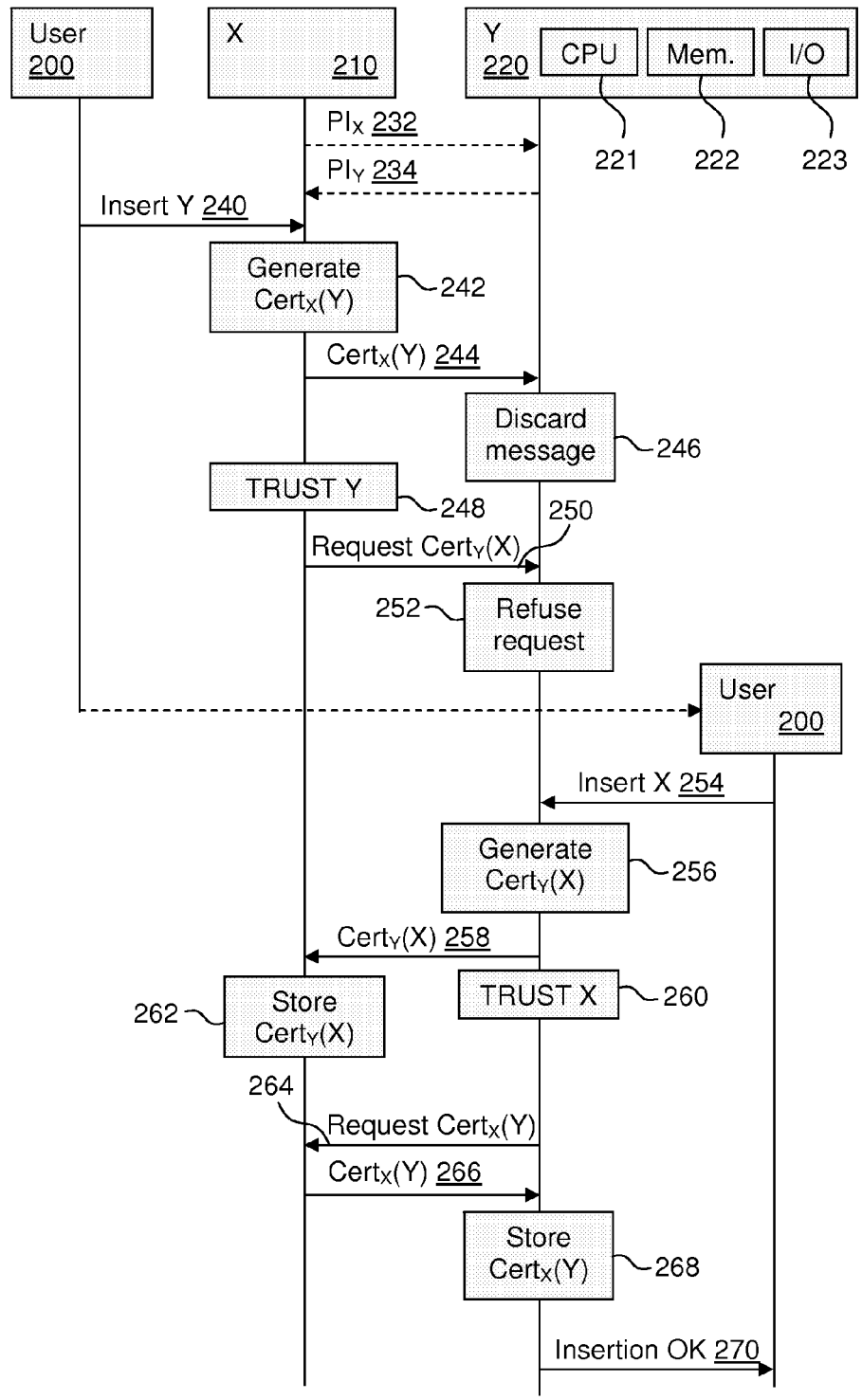
FIG. 2 illustrates device insertion into a community according to an exemplary scenario.

FIG. 2 illustrates device insertion into a community according to an exemplary scenario. In FIG. 2, it is assumed that device X 210 knows device Y 220 (which corresponds to the third possibility under Device insertion hereinbefore), that device Y 220 does not trust device X 210, and that both devices 210, 220 are aware of the identity $PI_X$ and $PI_Y$, respectively, of the other device as both identities previously have been broadcast as indicated by message arrows 232 and 234.

Device Y 220 comprises a CPU 221 adapted to perform the method, a memory 222 for storing e.g. certificates, and an interface (I/O) 223 for communication. While device X 210 also comprises these components, they are not illustrated in FIG. 2 for the sake of clarity.

The insertion starts when the user 200 instructs 240 device X to insert device Y. Device X generates 242 a certificate $Cert_X(Y)$, which it sends in message 244 to device Y. Upon reception of the message 244, device Y decides that it does not trust device X and discards 246 the message 244.

Device X, unaware that device Y has discarded the message 244, continues with the protocol and changes 248 the status of device Y to TRUSTED, as the user 200 instructed it to insert device Y. Then, device X sends a message 250, requesting the corresponding certificate $Cert_Y(X)$ from device Y. As device Y still does not trust device X, it refuses 252 the request 250.

At this point, the protocol grinds to a halt, as it is unable to continue. It should be noted that this is in fact intended.

The user 200 then moves to device Y. Note that in the protocol descriptions hereinbefore, device Y now (that until now was device B) becomes device A, although it will remain device Y in FIG. 2 for the sake of clarity. It should also be noted that when the user 200 instructs device Y to insert device X, the protocol does in effect restart.

The user 200 then instructs 254 device Y to insert device X. Device Y generates 256 $Cert_Y(X)$ and sends it in a message 258 to device X. Then it changes 260 the status of device X to TRUSTED, as the user 200 instructed it to insert device X.

Upon reception of the certificate message 258, device X stores 262 the certificate $Cert_Y(X)$ as it trusts device Y. Note that this is different from the situation hereinbefore where device Y did not trust device X.

Regardless of whether device X trusts device Y or not, device Y, who at the moment has no way of knowing this, continues the protocol, just as device X did hereinbefore. Device Y thus sends a message 264, requesting $Cert_X(Y)$ from device X. As device X trusts device Y, it returns a message 266 with $Cert_X(Y)$. Note that if device X does not store the certificate $Cert_X(Y)$ that it created in step 242, it must generate the certificate.

Upon reception of the certificate message 266, device Y stores 268 the certificate $Cert_X(Y)$ and indicates 270 to the user that the insertion is successful.

It will be appreciated from the example of FIG. 2 that, as previously indicated, the protocol may be performed without the use of clocks. The protocol moves on and if it gets stuck somewhere the user 200 may perform an action to restart the protocol. As such, there is no need for acknowledgements or timeouts during which a device accepts these acknowledgements. This may increase the security of the protocol as hackers may not exploit any loopholes created by these timeouts.

Preferred Algorithms

SignGenAlgo is preferably the signature generation algorithm called RSASSA-PSS-SIGN as described in PKCS #1, RSA Cryptography Standard, Version 2.1, RSA Laboratories 2002.

SignVerAlgo is preferably the signature generation algorithm called RSASSA-PSS-VERIFY as described in PKCS #1, RSA Cryptography Standard, Version 2.1, RSA Laboratories 2002.

HashAlgo is preferably the SHA-1 hash algorithm described in FIPS Publication 180-1: Secure Hash Standard, National Institute of Standards and Technology, 1994.

RandAlgo is any random algorithm that passes all the tests specified in NIST Special Publication 800-22: A Statistical Test Suite for Random and Pseudorandom Number Generators for Cryptographic Applications, 2001.

The invention claimed is:

1. A method of associating a first device with a second device, the first device storing an identity of the second device and the second device storing an identity of the first device, the method comprising the steps of:
   receiving by the first device instructions to associate with the second device;
   sending by the first device a certificate for the second device generated by the first device to the second device;
   storing by the first device an indication that it trusts the second device;
   discarding by the second device the certificate for the first device, since the second device does not store an indication that it trusts the first device;
   requesting by the first device from the second device a certificate for the first device generated by the second device;
   refusing the request by the second device, since the second device does not store an indication that it trusts the first device;
   receiving by the second device instructions to associate with the first device;
   storing by the second device an indication that it trusts the first device;
   after receiving the instructions, sending by the second device to the first device the certificate for the first device generated by the second device; and requesting by the second device from the first device a certificate for the second device generated by the first device;
   storing by the first device the certificate for the first device generated by the second device;
   sending by the first device to the second device the certificate for the second device generated by the first device; and
   storing by the second device the certificate for the second device generated by the first device and received in response to the request.

2. A method of associating a first device with a second device, the first device storing an identity of the second device and the second device storing an identity of the first device, the method comprising, at the first device, the steps of:
   receiving instructions to associate with the second device;
   sending a certificate for the second device generated by the first device to the second device;
   storing an indication that it trusts the second device;
   requesting from the second device a certificate for the first device generated by the second device;
   receiving from the second device the certificate for the first device generated by the second device;
   storing the certificate for the first device generated by the second device;

receiving a request from the second device for the certificate for the second device generated by the first device; and sending to the second device the certificate for the second device generated by the first device.

3. A method of associating a first device with a second device the first device storing an identity of the second device and the second device storing an identity of the first device, the method comprising, at the second device, the steps of:

receiving a certificate for the second device generated by the first device;

discarding the certificate for the first device, since the second device does not store an indication that it trusts the first device;

receiving a request from the first device for the certificate for the first device generated by the second device;

refusing the request, since the second device does not store an indication that it trusts the first device;

receiving instructions to associate with the first device; and storing an indication that it trusts the first device; and after receiving the instructions:

sending to the first device the certificate for the first device generated by the second device;

requesting from the first device a certificate for the second device generated by the first device;

receiving from the first device the certificate for the second device generated by the first device; and storing the certificate for the second device generated by the first device.

4. A first device adapted to associate with a second device, the first device storing an identity of the second device, the first device comprising:

means for receiving instructions to associate with the second device;

means for communication adapted to:

send a certificate for the second device generated by the first device to the second device;

send a request to the second device for a certificate for the first device generated by the second device;

receive from the second device the certificate for the first device generated by the second device;

receive a request from the second device for the certificate for the second device generated by the first device;

send to the second device the certificate for the second device generated by the first device;

memory means adapted to store:

an indication that it trusts the second device, upon reception by the receiving means instructions to associate with the second device;

store the certificate for the first device generated by the second device; and means for processing adapted to, if it does not store an indication that it trusts the second device, discard any message from the second device and refuse any request from the second device.

* * * * *